Aug. 15, 1939.  W. D. ALLISON  2,169,969
STABILIZER MECHANISM
Filed Aug. 4, 1938  3 Sheets-Sheet 1

INVENTOR
William D. Allison
BY Dike, Calver & Gray
ATTORNEYS.

Aug. 15, 1939.   W. D. ALLISON   2,169,969
STABILIZER MECHANISM
Filed Aug. 4, 1938   3 Sheets-Sheet 2

INVENTOR
William D. Allison.
BY Dike, Calver & Gray
ATTORNEYS

Aug. 15, 1939.   W. D. ALLISON   2,169,969
STABILIZER MECHANISM
Filed Aug. 4, 1938   3 Sheets-Sheet 3
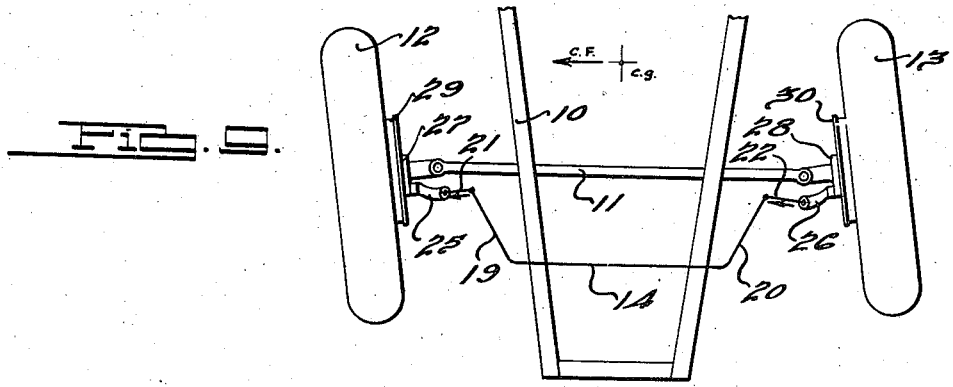
Fig. 9.
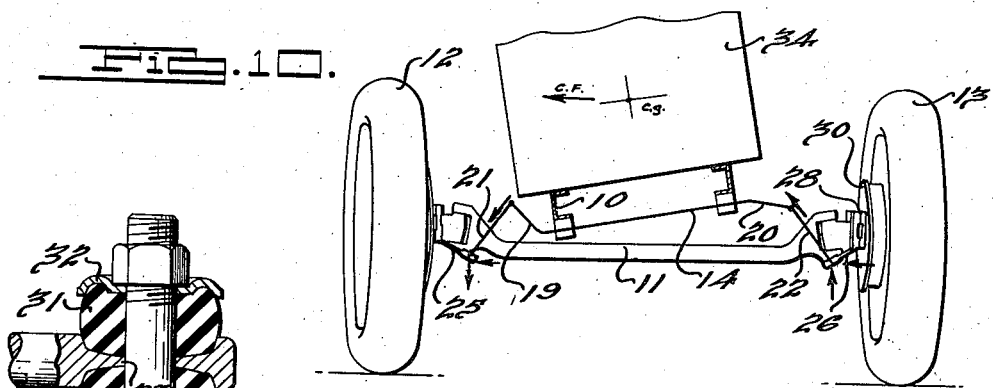
Fig. 10.
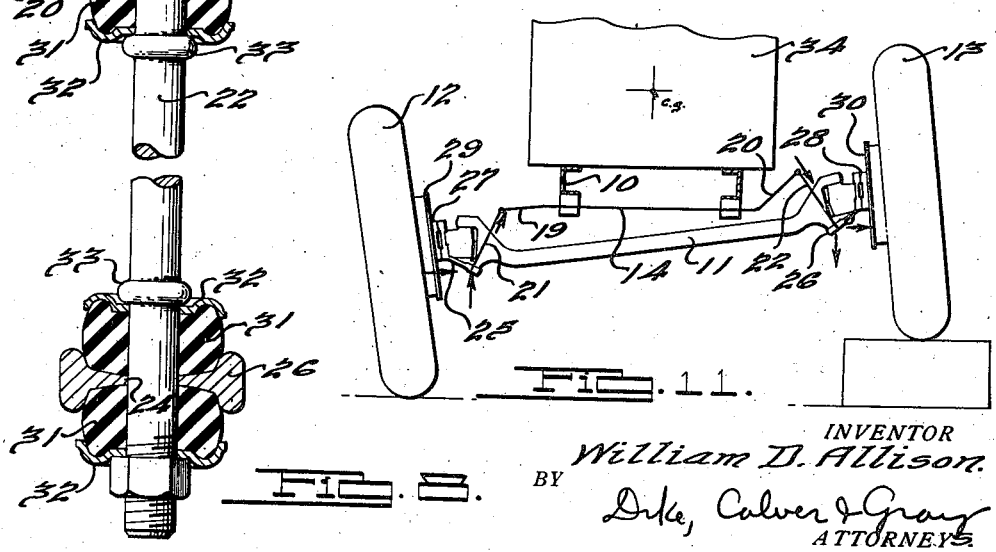
Fig. 11.
Fig. 8.
INVENTOR
William D. Allison.
BY
Dike, Calver & Gray
ATTORNEYS Patented Aug. 15, 1939

2,169,969

UNITED STATES PATENT OFFICE 2,169,969

STABILIZER MECHANISM

William D. Allison, Detroit, Mich., assignor to Hudson Motor Car Company, Detroit, Mich., a corporation of Michigan Application August 4, 1938, Serial No. 223,061

22 Claims. (Cl. 267—11)

This invention relates to a front wheel suspension for automotive vehicles, and more particularly to an improved stabilizer mechanism which markedly improves the stability and control of such vehicles.

In the operation of automotive vehicles, particularly at relatively high speeds, over uneven or rough roads or around curves, numerous problems arise in maintaining the desired control of the front wheels and maximum stability of the vehicle. For example, when the car is travelling at relatively good speed around a curve the body tends to roll or tilt upwardly due to the effect of centrifugal force. Frequently the tilt or roll of the body and frame under such circumstances results in the transmission of forces to the front wheels tending to turn or urge them undesirably in the direction in which the car is travelling around the curve and the car does not right itself as readily as desired when coming out of the turn or curve in the road. Again it frequently happens that while travelling over rough roads or uneven pavement, especially at relatively high speeds, the rise or fall of one front wheel relatively to the other, producing variations in the wheel camber, tends to set up gyroscopic forces, which results in causing a tendency or urge of the wheels to turn in one direction or the other. This effect is often characterized as wheel fight and is often felt by the driver in apparent jerkiness in the steering mechanism. Thus, under various conditions of operation and in various makes of cars with different types of front wheel suspensions, a variety of problems are encountered such as arise from the tendency of the front wheels to shift their material or intended direction, tendencies to shimmy under certain conditions, tendencies of the wheels to turn undesirably as a result of gyroscopic or centrifugal forces, and inability of the car to right itself immediately after coming out of a turn due to body roll or tilting induced by centrifugal forces.

An object of the invention is to provide a solution in part or in whole for the foregoing problems by overcoming the difficulties above pointed out and to provide an improved front wheel suspension in which better control of the front wheels and increased stability of the vehicle are produced under various operation conditions.

A further object is to provide a stabilizer for the front wheels of an automotive vehicle adapted to balance out or oppose the tendencies of the wheels, such as due to centrifugal or gyroscopic forces, to turn involuntarily from their intended course.

Another object of the invention is to provide a stabilizing means on the front end of an automotive vehicle frame, which is of such construction and arrangement that it tends to at least partially prevent the shifting tendency of the front wheels and excessive rolling of the body frequently encountered when driving cars at high speeds over uneven roads or around curves.

Another object of the present invention is to offset or neutralize, at least in part, the moment of force, tending to shift the front wheels, which is produced about the front wheel king pins as a result of the variable caster and load normally present in conventional front axles.

A further object is to provide a front end construction in which the tendency toward development of wheel shift is substantially diminished, and in which the body roll occurring on fast corners actually increases the recovery effort of the front wheels.

A still further object is to provide a front end construction which tends toward improved steering control and body stability, and is relatively simple and rugged in construction, relatively economical to manufacture, and capable of being readily replaced or repaired.

Other objects of this invention will appear in the following description and appended claims, reference being had to the accompanying drawings forming a part of this specification wherein like reference characters designate corresponding parts in the several views.

Fig. 8 is a side view, partly in section, of one of the connecting links forming part of the present invention, the section being taken on the line 8—8 of Fig. 2.

Figs. 9 and 10 are diagrammatic plan and front views respectively of portions of the front end of a vehicle chassis which has been provided with a stabilizer such as described herein, and showing the effects of said stabilizer upon the front wheels of the vehicle during a left turn.

Fig. 11 is a diagrammatic front view of similar portions of a vehicle chassis, showing the effects of the stabilizer upon the front wheels while the left front wheel is surmounting a bump or raised portion in the road.

Figure 1:
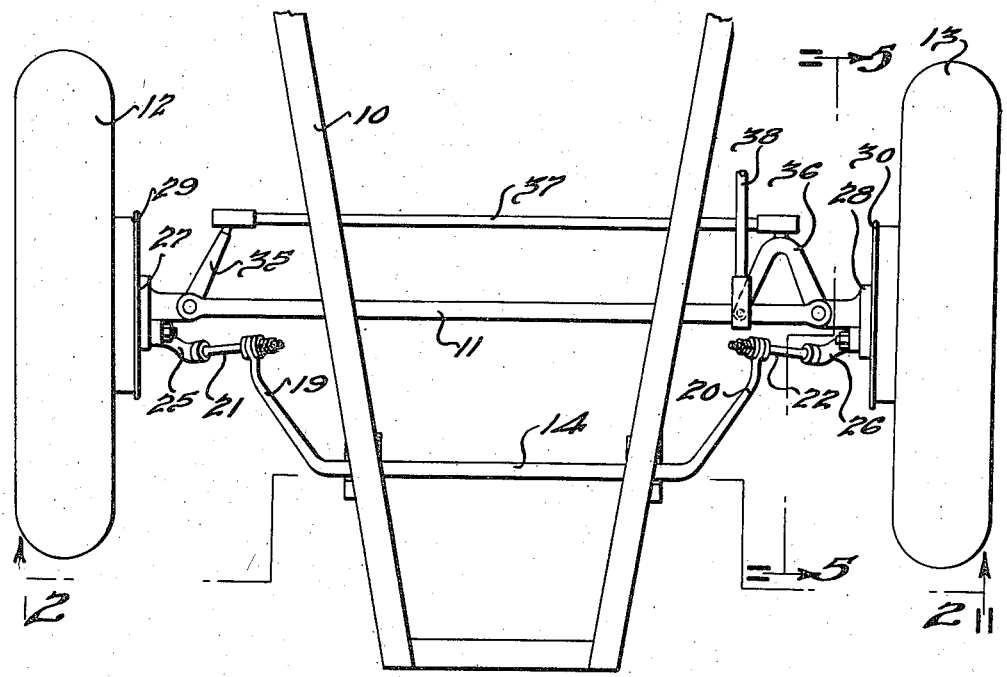
Fig. 1 is a plan view of the front portion of a motor vehicle chassis provided with a front wheel stabilizing mechanism forming one embodiment of the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

There is illustrated in the drawings, by way of example, a preferred embodiment of the invention as applied to a motor vehicle having a front end construction comprising a frame 10, a front axle 11, and a pair of front steering wheels 12 and 13 carried by said axle. The axle 11 is suspended from the frame 10 by means of any suitable spring assembly of conventional design, such assembly not being shown in the present instance as knowledge of the particular spring assembly employed is not necessary for a complete understanding of the invention.

For the purposes of the present invention a stabilizing device is provided which has the effect of wholly or partly neutralizing or offsetting the moments of force produced about the king pins as a result of the centrifugal and/or gyroscopic forces which are set up against the wheels under certain driving conditions, but particularly at high speeds, and tend to shift the wheels from their intended path. The said stabilizer comprises a torsion bar 14 which is journalled or otherwise rotatably supported upon the frame 10. In the present embodiment the bar 14 is supported by two rubber blocks or bushings 15 and 16 clamped or fitted in supporting yokes 17 and 18 bolted or otherwise fastened to the frame 10. The bar 14 has its end portions 19 and 20 extending completely through and beyond the blocks 15 and 16, said portions being bent at spaced points from said blocks at an angle somewhat less than 90°, whereby they normally extend rearwardly and slightly upwardly in the form of lever arms or crank-like members. It should be observed, however, that these lever arms 19 and 20 may extend forwardly or in any other direction with the same results provided suitable attachments to the front wheels can be made therefrom.

Extending downwardly and toward the wheels 12 and 13 are connecting links or rods 21 and 22 which are suitably fastened at their upper ends in apertures or eyes 23 in the ends of said crank arms 19 and 20 and at their lower ends in apertures 24 in brackets 25 and 26 (see Fig. 8). The brackets 25 and 26 are preferably supported on the spindles or king pin mountings 27 and 28 which also support the usual brake backing plates 29 and 30, it being found advantageous to use the same bolts which fasten said backing plates to said spindles to fasten the brackets 25 and 26 thereto. An arrangement such as the above insures that any forces exerted by the torsion bar 14 and connecting links 21 and 22 are applied to the wheels 12 and 13 at a point offset forwardly from the king pins which, as will subsequently appear, is important from the standpoint of the present invention.

The connecting rods 21 and 22 are fastened to lever arms 19 and 20 and brackets 25 and 26 by means of the rubber gaskets or washers 31 and the clamping plates 32, such as shown more clearly in Fig. 8. To accomplish this the rods 21 and 22 are provided at spaced points from each end with annular beads 33, against which a clamping plate 32 is placed. A gasket 31 is then applied over the end of the rod in contact with said plate, and after inserting the end of the rod 21 or 22 through the eye 23 of one of the crank arms 19 or 20 or through the eye 24 of one of the brackets 25 and 26, another gasket and plate is applied, whereupon the entire assembly may be firmly fastened by nuts or the like, which are turned down to place the rubber rings 31 in compression against opposite faces of the lever arms 19 and 20 and the brackets 25 and 26.

To obtain the desired results, i. e. to resist wheel shift, excessive body roll, and other detrimental effects, the connecting rods 21 and 22 are normally held by the torsion bar 14 and the brackets 25 and 26 at an angle to the longitudinal axis of their associated king pin. By adjusting this angle and the horizontal distance between the king pin axis and the point of attachment of the connecting rod 21 or 22 to its supporting bracket 25 or 26, and making the torsion bar 14, the crank arms 19 and 20, and the connecting links 21 and 22 of predetermined length and/or diameter, it is possible to create about each king pin a moment of force which is opposite in effect to and either wholly or partly neutralizes or balances the moment of force existing about the king pin as a result of the forces due to variations in caster and load and to the centrifugal forces developed during fast turns. The resulting balancing of forces not only greatly increases the control and stability of the vehicle, but improves to a large extent its easy driving characteristics, particularly at high speeds. Although the angle of the connecting links with respect to the king pins, when the wheels are straight and the car is on level ground, may be varied somewhat in accordance with varying conditions, it has been found for example, that an angle of about 30° to the vertical, which would be about 23° to the king pin axis, is satisfactory for the purposes of the present embodiment of the invention.

Figure 2:
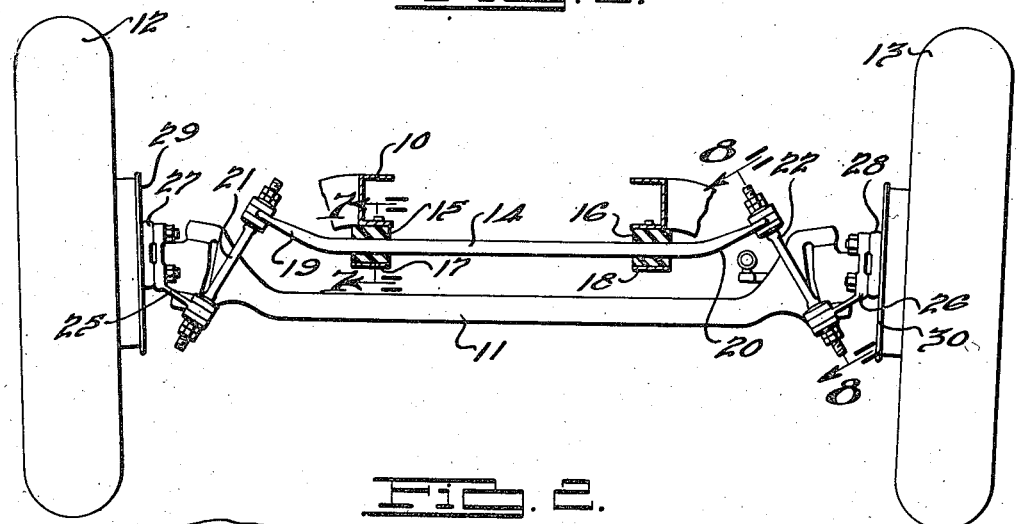
Fig. 2 is a front view, partly in section, of the parts shown in Fig. 1, the section being taken on the line 2—2 of that figure.
Figure 7:
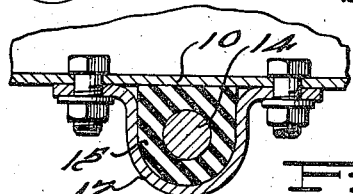
Fig. 7 is a sectional view of one of the stabilizer supporting brackets taken on the line 7—7 of Fig. 2.
Figure 3:
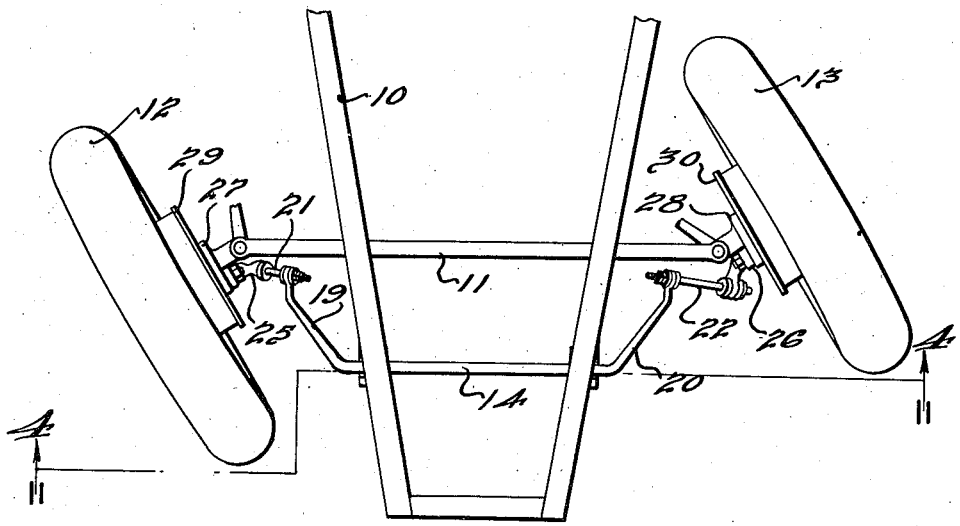
Fig. 3 is a plan view similar to that of Fig. 1, but showing the wheels in position for a left turn.
Figure 4:
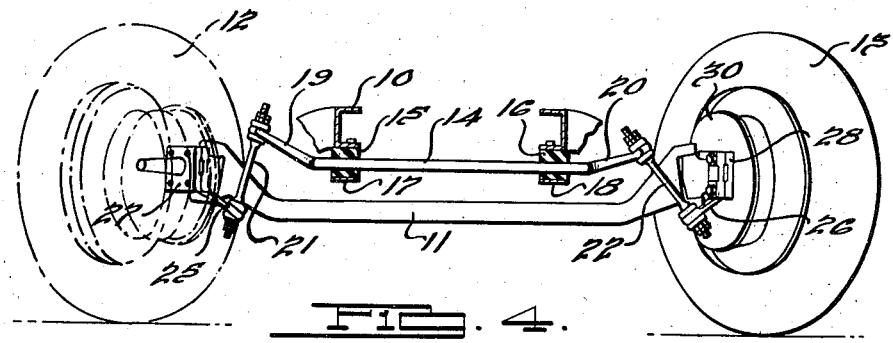
Fig. 4 is a front view, partly in section, of the parts shown in Fig. 3, the section being taken on the line 4—4 of that figure.
Figure 5:
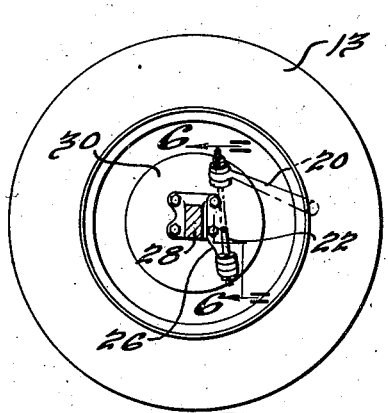
Fig. 5 is a side view, partly in section, of the left front wheel of a motor vehicle and stabilizer mounting thereon, the section being taken on the line 5—5 of Fig. 1.
Figure 6:
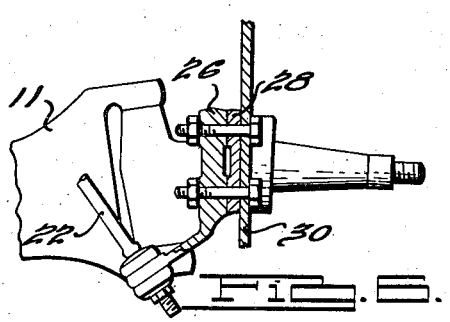
Fig. 6 is a sectional view of the stabilizer mounting taken on the line 6—6 of Fig. 5.

In further considering the action of the stabilizer constituting the present invention, it should be borne in mind that the bar 14 acts in torsion, that is, it is so connected to the wheels and the frame and is of such angularity at each end that it is given a torsional twist by either or both of the connecting rods 21 and 22, when the wheels 12 and 13 move separately upwardly or toward or away from the vehicle body as the result of road bumps or depressions, body roll, or the like. This torsional twist acts as a resistance by way of the rods 21 and 22 and the brackets 25 and 26 to the involuntary turning of the front wheels upon encountering bumps, and further, tends to assist in straightening the wheels upon coming out of a fast turn. A slight torsional twisting action is also exerted on the bar 14 by simple turning of the wheels for steering purposes. In Figs. 3 and 4 the effect of simple turning, i. e. on level ground and at slow speeds, is shown in somewhat exaggerated manner. Thus a comparison of the angularity of the crank arms 19 and 20 and the connecting rods 21 and 22 in Figs. 1 and 2 with the angularity of these parts as shown in Figs. 3 and 4 will assist in arriving at an understanding of the action of the stabilizer during steering at slow speeds on smooth level roads. It should be kept in mind, however, that in actual practice the forces exerted by or on the bar during simple turning or steering do not appreciably change or affect the ordinary steering characteristics of the vehicle.

The forces exerted by the bar 14, due to torsional action thereof, upon the connecting links or rods 21 and 22 consequent to the rise or fall of one wheel relatively to the other or to body roll are represented by the arrows in Figs. 9, 10 and 11. For example, with respect to Figs. 9 and 10 wherein the vehicle is shown as travelling to the left around a turn or curve, the body 34 due to centrifugal action will tilt or roll to a more or less extent to the right and since the torsion bar 14 is attached to the body and frame members it will tilt in accordance with the tilt of the body. This action results in a tendency to move the lever arms 19 and 20 oppositely in a vertical direction, placing the bar 14 in torsion. Hence a downward force will be transmitted along the length of the link 21 as shown by the arrow which will place this link in compression and conversely an upward force will be applied along the length of the link 22 placing this link in tension, as shown by the arrows in Fig. 10. The forces along the links 21 and 22 have each a vertical component and a horizontal component as also shown by the arrows. The horizontal component at the left in Fig. 10 transmits a force to the wheel 12 in advance of the king pin tending to straighten out the wheel. In like manner the horizontal component at the right in Fig. 10, which is transmitted in the same direction, exerts a force on the wheel 13 in advance of the king pin also tending to straighten out the wheel. In addition the torsion bar 14 when loaded or stressed as a result of the roll or tilting of the body and frame resists this movement and has the advantageous effect of righting the body when the car comes out of a turn. Thus it will be clear from the foregoing that the present stabilizer not only functions when the car is making a fast turn to resist body roll and to right the body, but also to assist in straightening the front wheels when coming out of a turn. It will be understood that similar action occurs when the car travels around a curve or makes a turn to the right.

The forces exerted by the stabilizer bar 14 on connecting rods 21 and 22 and which are transmitted to the wheels, when one of the wheels, such as the wheel 13, passes over a bump or elevation in the road are represented in Fig. 11. The rise of the wheel 13 relatively to the wheel 12 results in applying torsional stress to the bar 14 through the lever arms 19 and 20. As shown by the arrows at the right in Fig. 11 there is a downward force transmitted to the link 22, placing this link in compression, and this force has a vertical component and also a horizontal component. The horizontal component transmits a force to the wheel 13 at a point in advance of the king pin and this force is in opposition to the force due to gyroscopic action tending to turn the left hand front wheel 13 to the right when passing over the obstruction. Conversely the torsion bar 14 exerts an upward force along the opposite link 21 which force has also a vertical component and a horizontal component, and the latter exerts a force on the wheel 12 at a point in advance of the king pin likewise opposing the force on said wheel due to gyroscopic action tending to turn the right hand front wheel 12 to the right.

Although when wheel 13 sinks into a hole or depression, the tendency of the front wheels to turn as a result of forces consequent to a gyroscopic action are the opposite to that above explained, yet it will be understood that the action of the torsion bar in opposing such involuntary turning efforts is analogous to the above described. Further, it will be understood that the action of the stabilizer on the wheels, when the right wheel 12 hits a bump or encounters a depression, is similar although opposite to that described above with respect to the left wheel 13, as in each and every instance the bar 14 acts to oppose the forces tending to turn the wheels under the recited circumstances.

Upon utilizing my stabilizer in the manner referred to and described above, a marked improvement in road sense will be noted upon driving the car at all speeds, but particularly at high speeds. A noticeable recovery effect will also be observed on making fast turns, and in fact the car will be found to build up a recovery effort on such turns which increases in direct proportion to the speed of the car. Thus the stabilizer exerts an effect which is equivalent to an increase in the caster angle and in fact permits a reduction of several degrees in such angle. Further, it reduces to a marked extent any tendency to wheel fight due to gyroscopic forces, resists all tendency to shimmy, produces a much more substantial "feel" in the steering wheel, and permits greater control of the car in high winds.

The many advantages of the stabilizer in accordance with the present invention are apparent not only in connection with wheel suspensions of the conventional type, but also in connection with other types of suspensions, such as independent wheel suspensions, suspensions utilizing transverse springs with wishbone type radius rods, and suspensions using longitudinal torque arms, such as shown and described in the application of Northrup, Bartz and Whisler, Serial No. 104,978, filed October 10, 1936.

The rubber rings or gaskets 31 have a desirable cushioning effect and obviate chattering or vibratory noises by eliminating metal to metal contact. It is to be understood, however, that if desired a universal joint or other flexible joint may be substituted for the rubber gaskets described herein. Moreover, the bushings 15 and 16 may be made of any suitable bearing material, such as metal, wood, or the like, although the rubber bushings described herein have been found to be especially advantageous, since they resist the lateral movement of the stabilizer bar with respect to the frame.

Portions of conventional steering mechanism have been shown in Fig. 1, including the steering arms 35 and 36, tie rod 37, and drag link 38. It is to be understood, however, that the invention is entirely independent of the type and construction of steering mechanism used.

I claim:

1. In a front wheel suspension for a motor vehicle, a stabilizer, comprising a transverse bar which is movably mounted on the frame adjacent the front wheel supporting means and has its ends operatively connected with stationary portions on the front wheels.

2. In a front wheel suspension for a motor vehicle, a stabilizer comprising a bar which extends transversely across the vehicle frame and is bent longitudinally of the vehicle at its ends at spaced points from said frame, said ends each being operatively connected to a stationary portion of one of the wheels of said vehicle.

3. In a front wheel suspension for a motor vehicle, the combination of a frame, front wheel supporting means, a pair of front wheels, and a stabilizer therefor, said stabilizer comprising a transverse bar extending across said frame and having its ends bent longitudinally of the vehicle and connected at said ends to stationary portions of said wheels by links which extend angularly with respect to said bent ends and said wheels.

4. In a front wheel suspension for a motor vehicle, the combination of a frame, front wheel supporting means, a pair of front wheels, and a stabilizer therefor, said stabilizer comprising a bar mounted transversely on the frame and operatively connected at each end with the spindle mounting of one of said wheels, said bar being rotatable with respect to said frame.

5. In a front wheel suspension for a motor vehicle, the combination of a frame, front wheel supporting means, and a transverse torsion member extending across and beyond each side of said frame and operatively connected at each end with stationary portions on the front wheels.

6. In a front wheel suspension for a motor vehicle, the combination of a frame, front wheel supporting means, a pair of front wheels each supported by a king pin on opposite ends of said axle, and a stabilizer for said wheel suspension, said stabilizer comprising a transverse torsion bar supported on said frame and operatively connected at each of its ends with a fixed portion of one of said wheels, each of said connections being offset from said king pin.

7. In a front wheel suspension for a motor vehicle, the combination of a frame, front wheel supporting means, a pair of front wheels each supported by a king pin on opposite ends of said axle, and a stabilizer for said wheel suspension, said stabilizer comprising a transverse bar supported on said frame and operatively connected at each end by means of an inclined link to a fixed portion on one of said wheels, each of said links being provided with such an angle of inclination with respect to the longitudinal axes of said king pins that a horizontal moment of force is created around each king pin which offsets at least in part the normal caster and load moments existing thereabout.

8. A wheel suspension according to claim 1 in which said bar is rotatably mounted on the frame and is placed in torsion by forces transmitted thereto upon predetermined relative movement of the frame and one of said wheels.

9. A wheel suspension according to claim 2 in which the connections between said ends and the wheels comprise links transversely inclined one in a direction opposite to the other.

10. A wheel suspension according to claim 3 in which said bar is resiliently mounted on the frame and is placed in torsion by horizontal forces transmitted thereto upon predetermined relative vertical movement of the frame and one of said wheels.

11. A wheel suspension according to claim 4 in which said bar is resiliently mounted on the frame and is placed in torsion by horizontal forces transmitted thereto upon predetermined relative vertical movement of the frame and one of said wheels.

12. A wheel suspension according to claim 5 in which the connections between said torsion member and wheels comprise articulated links effective to place said member in torsion by horizontal forces transmitted thereto upon predetermined relative vertical movement of the frame and one of said wheels.

13. In a front wheel suspension for a motor vehicle having a frame, front steering wheels and torsion means connecting said wheels and frame and adapted to be stressed by horizontal forces transmitted thereto upon predetermined relative vertical movement of the frame and one of said wheels.

14. In a front wheel suspension for a motor vehicle having a frame, front steering wheels, a member mounted on the frame, and connections between said member and wheels for stressing said member and movable in opposition one to the other by horizontal forces transmitted thereto upon a predetermined vertical relative movement of the frame and one of said wheels.

15. In a front wheel suspension for a motor vehicle having a frame, front steering wheels, a member connected to the frame and having crank arms at opposite ends, and connections between said arms and wheels effective to move said arms in opposite directions to stress said member as a result of horizontal forces transmitted thereto upon predetermined relative vertical movement of the frame and one of said wheels.

16. A wheel suspension according to claim 13 in which the torsion means is connected to non-revoluble portions of the wheels at points offset longitudinally of the vehicle from the steering axes of the wheels.

17. A wheel suspension according to claim 13 in which the torsion means is connected to non-revoluble portions of the wheels at points offset forwardly of the steering axes of the wheels.

18. A wheel suspension for a motor vehicle having a frame, front steering wheels, a transverse member resiliently connected to the frame and having rearwardly directed crank arms at opposite ends, and downwardly and outwardly inclined links connecting the ends of said arms to non-revoluble portions of the wheels, the connections between said links arms and wheel portions including rubber adapted to be stressed by horizontal forces transmitted thereto upon predetermined relative vertical movement of the frame and one of said wheels.

19. In a vehicle having a frame, front wheel supporting means including transversely spaced king pins, resilient means interposed between the front wheel supporting means and frame, steerable wheels having non-rotatable portions through which the king pins are mounted, and means carried by the frame and operably connected to the non-rotatable portions of the steerable wheels to transmit to each of the steerable wheels a transverse horizontal component of a force produced by and proportional to vertical displacement of each of the steerable wheels relative to the frame.

20. A wheel suspension for a motor vehicle having a frame, front wheel supporting means including transversely spaced king pins, steerable wheels having non-rotatable portions through which the king pins are mounted, and means carried by the frame and operably connected to the non-rotatable portions of the steerable wheels at points spaced longitudinally of the vehicle relative to the king pins to transmit to each of the steerable wheels a transverse horizontal component of a force produced by and proportional to vertical displacement of each of the steerable wheels relative to the frame.

21. In a motor vehicle having a frame structure, steerable wheel supporting means carried by the frame structure, steerable wheels having stationary portions mounted on said wheel supporting means, and stabilizer means comprising a transversely extending member movably mounted on the frame structure and operably connected to said stationary portions of the steerable wheels.

22. A stabilizer for a motor vehicle having a frame structure, wheel supporting means carried by the frame structure, steerable wheels having stationary portions mounted on said wheel supporting means, said stabilizer comprising a generally transversely extending member movably mounted on the frame structure and operably connected to said stationary portions of the steerable wheels to impart substantially predetermined horizontal forces to the steerable wheels upon substantially predetermined vertical displacement of one of the steerable wheels relative to the frame structure.

WILLIAM D. ALLISON.